United States Patent
Carella et al.

(10) Patent No.: US 11,655,325 B2
(45) Date of Patent: May 23, 2023

(54) FLUORINATED BLOCK COPOLYMERS AND APPLICATION THEREOF

(71) Applicant: SOLVAY SPECIALTY POLYMERS ITALY S.P.A., Bollate (IT)

(72) Inventors: Serena Carella, Parabiago (IT); Andrea Vittorio Oriani, Milan (IT); Alessandro Ghielmi, Frankfurt am Main (DE); Mirko Mazzola, Milan (IT); Elena Molena, Bollate (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 310 days.

(21) Appl. No.: 16/771,663

(22) PCT Filed: Dec. 17, 2018

(86) PCT No.: PCT/EP2018/085169
§ 371 (c)(1),
(2) Date: Jun. 10, 2020

(87) PCT Pub. No.: WO2019/121494
PCT Pub. Date: Jun. 27, 2019

(65) Prior Publication Data
US 2021/0189046 A1 Jun. 24, 2021

(30) Foreign Application Priority Data
Dec. 19, 2017 (EP) .................... 17208375

(51) Int. Cl.
| | |
|---|---|
| *H01M 50/414* | (2021.01) |
| *H01M 50/403* | (2021.01) |
| *C09D 153/00* | (2006.01) |
| *C08F 293/00* | (2006.01) |
| *H01M 50/449* | (2021.01) |
| *H01G 9/02* | (2006.01) |
| *H01G 11/52* | (2013.01) |
| *H01M 50/489* | (2021.01) |
| *H01M 50/42* | (2021.01) |
| *H01M 50/426* | (2021.01) |

(52) U.S. Cl.
CPC .......... *C08F 293/00* (2013.01); *C09D 153/00* (2013.01); *H01G 9/02* (2013.01); *H01G 11/52* (2013.01); *H01M 50/403* (2021.01); *H01M 50/414* (2021.01); *H01M 50/42* (2021.01); *H01M 50/426* (2021.01); *H01M 50/449* (2021.01); *H01M 50/489* (2021.01)

(58) Field of Classification Search
CPC . C08F 293/00; H01M 50/414; H01M 50/403; H01M 50/449; C09D 153/00; H01G 9/02; H01G 11/52
See application file for complete search history.

(56) References Cited

U.S. PATENT DOCUMENTS

| | | | | |
|---|---|---|---|---|
| 5,439,980 | A * | 8/1995 | Yutani ..................... | C08F 20/12 525/344 |
| 8,337,725 | B2 * | 12/2012 | Abusleme .............. | B01D 69/02 252/511 |
| 2004/0211943 | A1 | 10/2004 | Okahara et al. | |
| 2013/0296512 | A1 * | 11/2013 | Marrani .............. | C08F 214/225 526/209 |
| 2014/0120269 | A1 * | 5/2014 | Abusleme ............ | H01M 50/411 427/532 |
| 2014/0154611 | A1 | 6/2014 | Ameduri et al. | |
| 2014/0315080 | A1 * | 10/2014 | Abusleme ........... | C08F 214/186 429/189 |
| 2015/0104691 | A1 | 4/2015 | Nakamura et al. | |
| 2016/0293998 | A1 * | 10/2016 | Moreau ............... | H01M 50/406 |
| 2017/0092915 | A1 | 3/2017 | Ku et al. | |

FOREIGN PATENT DOCUMENTS

| | | |
|---|---|---|
| CN | 104610518 A | 5/2015 |
| EP | 2455408 A1 | 5/2012 |
| WO | 2016149238 A1 | 9/2016 |

OTHER PUBLICATIONS

Decision to grant a Patent issued by EPO for Application EP EP.18819113 (dated 2022).*
Standard ISO 13321—Particle size analysis—Photon correlation spectroscopy—Jul. 1, 1996—p. 1-20.

* cited by examiner

*Primary Examiner* — Alexander Usyatinsky
(74) *Attorney, Agent, or Firm* — Osha Bergman Watanabe & Burton LLP

(57) ABSTRACT

Provided are fluorinated block copolymers comprising alternating hard blocks and soft blocks, wherein both said hard and soft blocks comprise vinylidenfluoride (VDF). Also provided is the use of said block copolymers in applications for lithium batteries including an electrochemical cell and a separator for an electrochemical cell which is coated with a composition comprising the fluorinated block copolymers. Further provided is a process for the manufacture of the separator.

20 Claims, No Drawings

FLUORINATED BLOCK COPOLYMERS AND APPLICATION THEREOF

CROSS-REFERENCE TO RELATED APPLICATIONS

This application is a U.S. national stage entry under 35 U.S.C. § 371 of International Application No. PCT/EP2018/085169 filed Dec. 17, 2018, which claims priority to European application No. 17208375.0, filed on Dec. 19, 2017. The entire contents of these applications are explicitly incorporated herein by this reference.

TECHNICAL FIELD

The present invention relates to fluorinated block copolymers comprising alternated hard block and soft block, wherein both said hard and soft blocks comprise vinylidenfluoride (VDF). The present invention further relates to the use of said block copolymers in applications for lithium batteries.

BACKGROUND ART

Co-polymers comprising recurring units derived from vinylidenfluoride (VDF) and at least one other partially or fully fluorinated co-monomer, and uses thereof have been disclosed in the art.

For example, US 2004/0211943 (HITACHI POWDERED METALS CO.) 28 Oct. 2004 discloses a coating for separator of fuel cells, aimed at solving the adhesion issue between the coating film obtained from a conductive coating and the base material of the separator. To solve this issue, a coating is provided wherein graphite is used as the conductive material, copolymer of VDF and hexafluoropropylene (HFP) is contained at not less than 10% by weight as a binder of the coating, an organic solvent having compatibility with the binder is used as a medium.

This document however does not disclose block co-polymers based on VDF.

EP 2455408 A (DAIKIN INDUSTRIES, LTD.) discloses a method for producing a fluorine-block copolymer comprising the reaction of a fluoropolymer (A) with a radical polymerizable monomer (M) in the presence of a sulfur compound. Preferably, fluoropolymer (A) has the structure of a vinylidene fluoride polymer chain and the radical polymerizable monomer (M) is selected from the group consisting of vinyl fluoride monomers, non-fluoro ethylenic monomers, (meth)acrylic monomers, styrenic monomers, vinyl etheric monomers and vinyl ester monomers. VDF/HFP copolymer is disclosed, preferably having a composition of from 45:55 mol. % and up to 85:15 mol. %, more preferably of from 50:50 mol. % and up to 80:20 mol. % (in other words, the HFP monomer is used in an amount of from 15 to 55 mol. %, preferably from 20 to 50 mol. %).

Accordingly, this document does not disclose VDF/HFP copolymers wherein the HFP is in a molar amount of less than 15 mol. % compared to the molar % of the VDF.

In addition, this document neither suggests to provide a copolymer of VDF and (meth)acrylic monomer as the radical polymerizable monomer (M) nor it disclose in which molar amount the (meth)acrylic monomer should be used.

US 2014/0154611 (ARKEMA FRANCE; ECOLE NATIONALE SUPERIEURE DE CHIMIE DE MONTPELLIER) discloses a method for preparing a fluorinated copolymer comprising a step of copolymerization of a fluorinated monomer (of the vinylidene fluoride type) with an alfa-trifluoromethacrylic acid monomer of a derivative thereof, in the presence of a xanthate or trithiocarbonate compound.

WO 2016/149238 (ARKEMA INC.) discloses modified fluoropolymers comprising fluoromonomer units and from 0.1 to 25 weight percent of residual functional group, based on the total amount of monomer, wherein said residual functional groups come from one or more low molecular weight polymeric functional chain transfer agents. The modified fluoropolymer is said to be useful to prepare an article selected from electrode, separator for a battery or a capacitor, a porous membrane or a hollow fibre membrane; to coat at least one surface of an article; or to provide a multi-layer construction wherein said modified fluoropolymer forms a tie layer between a fluoropolymer layer and a polymer layer that is incompatible with said fluoropolymer.

SUMMARY OF INVENTION

The Applicant perceived that in the technical field of batteries, notably of lithium batteries, the problem of providing a separator comprising a coating capable of providing good outstanding adhesion to the separator base material and which at the same time shows no swelling due to the contact with the electrolyte solvent, has not been solved yet.

Accordingly, the Applicant faced the problem of providing a composition suitable for coating the base material of a separator for an electrochemical cell, said composition being such to provide at the same time outstanding adhesion to the separator base material and no swelling when immersed in the electrolyte solvent, thus improving the long term performances of the battery.

Surprisingly, the Applicant found when a separator for an electrochemical cell is at least partially coated with a composition comprising at least one fluorinated block copolymer having a backbone comprising hard blocks alternated with soft blocks, at the same time good adhesion to the base material of the separator and reduced swelling is obtained.

Thus, in a first aspect, the present invention relates to a fluorinated block copolymer [copolymer ($F_b$)] comprising:

at least one first block [block (A)] consisting of a sequence of recurring units, said sequence consisting of recurring units derived from 1,1-difluoroethylene (VDF), and optionally from at least one monomer [monomer (M)] comprising at least one ethylenically unsaturated double bond and at least one functional group selected from —COOH and —OH; and at least one second block [block (B)] consisting of a sequence of recurring units, said sequence consisting of recurring units derived from 1,1-difluoroethylene (VDF), at least one perhalogenated monomer [monomer (PF)], and optionally from at least one monomer (M) as defined above, with the proviso that at least one of said block (A) and said block (B) comprises recurring units derived from said monomer (M);

wherein said copolymer ($F_b$) comprises:

recurring units derived from said at least one monomer (PF) in a total amount from 1.5 mol. % to less than 15 mol. % based on 100% moles of said copolymer ($F_b$); and recurring units derived from said monomer (M) in a total amount of from 0.05 mol. % to 2 mol. % based on 100% moles of said copolymer ($F_b$), the remaining amount up to 100% moles being from recurring units derived from VDF.

In a second aspect, the present invention relates to a composition [composition (C1)] in the form of an aqueous dispersion comprising primary particles of at least copolymer ($F_b$) as defined above.

Preferably, the primary particles of said copolymer ($F_b$) in said composition (C1) have an average primary size of less than 1 micrometer, as measured according to ISO 13321.

In a third aspect, the present invention relates to a separator for an electrochemical cell comprising a substrate layer [layer ($S_C$)] at least partially coated with composition (C1) as defined above.

In a fourth aspect, the present invention relates to a process for the manufacture of a separator for an electrochemical cell as defined above, said process comprising the following steps:
i) providing a non-coated substrate layer [layer (LS)];
ii) providing composition (C1) as defined above;
iii) applying said composition (C1) of step (ii) at least partially onto at least one portion of said substrate layer (LS), thus providing an at least partially coated substrate layer [layer ($S_C$)]; and
iv) drying said layer ($S_C$) of step (iii).

In a fifth aspect, the present invention relates to an electrochemical cell, such as a secondary battery or a capacitor, comprising the at least partially coated separator as defined above.

DESCRIPTION OF EMBODIMENTS

As used within the present description and in the following claims:
the use of parentheses around symbols or numbers identifying the formulae, for example in expressions like "polymer (P)", etc., has the mere purpose of better distinguishing the symbol or number from the rest of the text and, hence, said parenthesis can also be omitted;
the terms "1,1-difluoroethylene", "1,1-difluoroethene" and "vinylidene fluoride" are used as synonyms;
the terms "poly-(1,1-difluoroethylene)" and "polyvinylidene fluoride" are used as synonyms;
the term "separator" is intended to indicate a porous monolayer or multilayer polymeric material which electrically and physically separates electrodes of opposite polarities in an electrochemical cell and is permeable to ions flowing between them;
the expression "substrate layer" is intended to indicate either a monolayer substrate consisting of a single layer or a multilayer substrate comprising at least two layers adjacent to each other;
the expression "composite separator" is intended to indicate a separator as defined above, wherein at least one non-electroactive inorganic filler material is incorporated into a polymeric binder material;
the expression "electrochemical cell" is intended to indicate an electrochemical cell comprising a positive electrode, a negative electrode and a liquid electrolyte, wherein a monolayer or multilayer separator is adhered to at least one surface of one of said electrodes. Non-limitative examples of electrochemical cells include, notably, batteries, preferably secondary batteries, and electric double layer capacitors;
the expression "secondary battery" is intended to indicate a rechargeable battery. Non-limitative examples of secondary batteries include, notably, alkaline or alkaline-earth secondary batteries.

Preferably, said at least one monomer (PF) is selected in the group comprising, more preferably consisting of:
$C_2$-$C_8$ perfluoroolefins, such as notably tetrafluoroethylene (TFE) and hexafluoropropylene (HFP);
chloro- and/or bromo- and/or iodo-$C_2$-$C_6$ fluoroolefins, such as notably chlorotrifluoroethylene (CTFE);
$CF_2$=$CFOX_0$
wherein $X_0$ is selected from: $C_1$-$C_{12}$ perfluoroalkyl group; $C_1$-$C_{12}$ perfluorooxyalkyl group having one or more ether groups, such as perfluoro-2-propoxy-propyl group; —$CF_2OR_{f2}$ wherein $R_{f2}$ is a $C_1$-$C_6$ perfluoroalkyl group, such as $CF_3$, $C_2F_5$, $C_3F_7$ or a $C_1$-$C_6$ (per)fluorooxyalkyl group having one or more ether groups such as —$C_2F_5$—O—$CF_3$;
perfluorodioxoles.

According to a preferred embodiment, said at least one monomer (PF) is a $C_2$-$C_8$ perfluoroolefins; even more preferably HFP.

Preferably, said copolymer ($F_b$) comprises recurring units derived from HFP in an amount from 2 mol. % to less than 12 mol. % based on 100 moles of said copolymer ($F_b$), more preferably from 3 mol. % to about 10 mol. %.

Preferably, said copolymer ($F_b$) comprises recurring units derived from monomer (M) in an amount of from 0.5 mol. % to 1.9 mol. % based on 100 moles of said copolymer ($F_b$).

Preferably, said at least one monomer (M) is at least one (meth)acrylic monomer [monomer (MA)].

Preferably, said monomer (MA) is a monomer structurally derived from acrylic acid or from methacrylic acid and complying with formula (I):

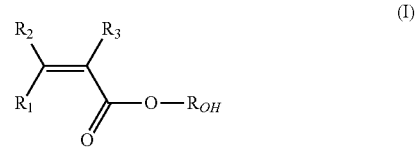

wherein:
$R_1$, $R_2$ and $R_3$, equal to or different from each other, are independently selected from a hydrogen atom and a $C_1$-$C_3$ hydrocarbon group, and
$R_{OH}$ is a hydrogen atom or a $C_1$-$C_5$ hydrocarbon moiety comprising at least one hydroxyl group.

Preferably, monomer (MA) complies with formula (II):

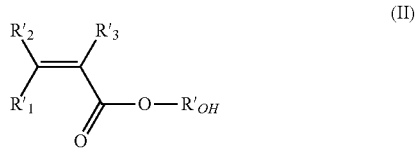

wherein:
$R'_1$, $R'_2$ and $R'_3$ are hydrogen atoms, and
$R'_{OH}$ is a hydrogen atom or a $C_1$-$C_5$ hydrocarbon moiety comprising at least one hydroxyl group.

Non-limiting examples of monomers (MA) include, notably, acrylic acid, methacrylic acid, hydroxyethylmethacrylate, hydroxyethylacrylate, hydroxypropylmethacrylate, hydroxypropylacrylate, hydroxyethylhexylmethacrylate, hydroxyethylhexylacrylate, and mixtures thereof.

Preferably, said copolymer ($F_b$) comprises recurring units derived from monomer (MA) in an amount of from 0.5 mol. % to 1.9 mol. % based on 100 moles of said copolymer ($F_b$).

The monomer (MA) is more preferably selected from the followings:

hydroxyethyl acrylate (HEA) of formula:

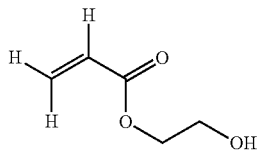

2-hydroxypropyl acrylate (HPA) of either of formulae:

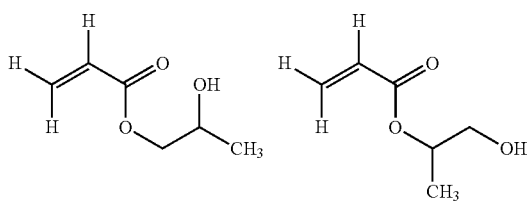

acrylic acid (AA) of formula:

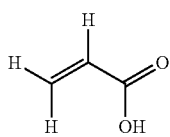

and mixtures thereof.

The (meth)acrylic monomer (MA) is even more preferably acrylic acid (AA) or hydroxyethyl acrylate (HEA).

Preferably, the weight ratio between said block(s) (A) and said block(s) (B) in said copolymer ($F_b$) is comprised between 20 and 50, more preferably between 25 and 45.

Advantageously, said copolymer ($F_b$) comprises alternately arranged blocks (A) and block(s) (B). In other words, copolymer ($F_b$) according to the present invention does not comprise randomly distributed blocks (A) and/or (B).

According to an embodiment, one block (A) is interposed between two blocks (B), i.e. co-polymer ($F_b$) complies with the following formula: B-A-B.

According to another embodiment, one block (B) is interposed between two blocks (A), i.e. co-polymer ($F_b$) complies with the following formula: A-B-A.

According to a more preferred embodiment, both said block (A) and said block (B) comprise recurring units derived from said monomer (MA).

Preferably, said block (A) consists of a sequence of recurring units derived from 1,1-difluoroethylene (VDF) and from monomer (MA).

Preferably, said block (B) consists of a sequence of recurring units derived from 1,1-difluoroethylene (VDF), hexafluoropropene (HFP) and monomer (MA.

Copolymers ($F_b$) according to the present invention comprising said monomer (MA) in both said block (A) and said block (B) can be advantageously synthetized in an emulsion polymerization process, comprising the following steps:

(Ia) contacting a first portion of VDF monomer with at least a first portion of monomer (M) and an aqueous medium, to provide a first mixture [mixture Ma1)];

(IIa) polymerizing said mixture (Ma1);

(IIIa) contacting the polymerized mixture (Ma1) of step (II) with at least a first portion of a mixture comprising VDF and monomer (PF) and with a second portion of monomer (M), to provide a second mixture [mixture (Ma2)];

(IVa) polymerizing said mixture (Ma2), thus providing said copolymer ($F_b$) complying with formula B-A-B;

or (Ib) contacting at least a first portion of a mixture comprising VDF and monomer (PF) with at least a first portion of monomer (M) and an aqueous medium, to provide a first mixture [mixture (Mb1)];

(IIb) polymerizing said mixture (Mb1);

(IIIb) contacting the polymerized mixture (Mb1) of step (II) with at least a first portion of VDF monomer and with a second portion of monomer (M), to provide a second mixture [mixture (Mb2)];

(IVb) polymerizing said mixture (Mb2), thus providing said copolymer ($F_b$) complying with formula A-B-A.

The emulsion polymerization process of the invention is preferably carried out at a polymerization pressure typically between 10 and 70 bar, preferably between 15 and 50 bar.

Polymerization temperature can be properly selected by the person skilled in the art on the basis of the monomers used. Preferably, the emulsion polymerization process of the invention is carried out at a temperature from 70° C. to 150° C.

Preferably, the VDF monomer and the monomer (PF) are feed to the reaction environment in the form of gas.

The process of the invention, notably step (Ia) and step (Ib), is advantageously carried out in the presence of at least one radical initiator. While the choice of the radical initiator is not particularly limited, it is understood that radical initiators suitable for an aqueous emulsion polymerization process are selected from compounds capable of initiating and/or accelerating the polymerization process and include, but are not limited to, persulfates, such as sodium, potassium and ammonium persulfates; organic peroxide, including notably alkyl peroxide, dialkyl peroxide (such as di-tert-butylperoxide—DTBP), diacyl-peroxide, peroxydicarbonates (such as di-n-propyl peroxydicarbonate and diisopropyl peroxydicarbonate), peroxy esters (such as tert-amyl peroxypivalate, tertbutyl peroxypivalate and succinic acid peroxide); and mixtures thereof.

Preferably, said step (Ia) is performed in the presence of a chain transfer agent. Suitable chain transfer agents suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$.

For the purpose of the present invention, by "average primary particle size" it is intended to denote primary particles of copolymer ($F_b$) derived from aqueous emulsion polymerization.

Primary particles of said copolymer ($F_b$) are thus to be intended distinguishable from agglomerates (i.e. collection of primary particles), which might be obtained by recovery and conditioning steps of such polymer/copolymer manufacture such as concentration and/or coagulation of aqueous latexes of the copolymer ($F_b$) and subsequent drying and homogenization to yield the respective powders.

The aqueous latex of the composition (C1) used for coating the separator of the invention is thus distinguishable from an aqueous slurry prepared by dispersing powders a polymer or of a copolymer in an aqueous medium. The average particle size of powders of a polymer or copolymer dispersed in an aqueous slurry is typically higher than 1 μm, as measured according to ISO 13321.

Preferably, the average particle size of the primary particles of copolymer ($F_b$) as defined above is above 10 nm, more preferably above 15 nm, even more preferably above 20 nm, and/or is below to 600 nm, more preferably below 400 or below 300 nm, as measured according to ISO 13321.

Preferably, the total solid content of composition (C1) is from 20 wt. % to 60 wt. % over the total weight of composition (C1), more preferably from 45 wt. % to 55 wt. %.

Composition (C1) can optionally comprise at least one other component, in addition to the primary particles of said copolymer ($F_b$).

Preferably, said at least one optional component is selected in the group comprising: antifoam agents, surfactants, anti-bacterial agents, fillers and mixtures thereof.

Typically, each of such optional components, when present, is in an amount lower than 15 wt. % over the weight of the latex solid content, preferably below 10 wt. % or below 7 wt. %.

The separator for an electrochemical cell of the present invention can advantageously be an electrically insulating composite separator suitable for use in an electrochemical cell. When used in an electrochemical cell, the composite separator is generally filled with an electrolyte which advantageously allows ionic conduction within the electrochemical cell. Preferably, said electrolyte is liquid or semi-liquid.

According to a preferred embodiment, the separator of the invention has two surfaces, wherein at least one surface is at least partially coated with a composition [composition (C2)] comprising said composition (C1) as defined above and non-electroactive inorganic filler material uniformly distributed therein.

According to another preferred embodiment, the separator of the invention has two surfaces, wherein at least one surface comprises
- a first layer adhered to said at least one surface obtainable from a composition [composition (C3*)] comprising a binder and non-electroactive inorganic filler material, and
- a second layer comprising composition (C1) as defined above.

By the term "non-electroactive inorganic filler material", it is hereby intended to denote an electrically non-conducting inorganic filler material, which is suitable for the manufacture of an electrically insulating separator for electrochemical cells.

The non-electroactive inorganic filler material in the separator according to the invention typically has an electrical resistivity (p) of at least $0.1 \times 10^{10}$ ohm cm, preferably of at least $0.1 \times 10^{12}$ ohm cm, as measured at 20° C. according to ASTM D 257. Non-limitative examples of suitable non-electroactive inorganic filler materials include, notably, natural and synthetic silicas, zeolites, aluminas, titanias, metal carbonates, zirconias, silicon phosphates and silicates and the like. The non-electroactive inorganic filler material is typically under the form of particles having an average size of from 0.01 µm to 50 µm, as measured according to ISO 13321. Typically, the non-electroactive inorganic filler material is present in amount from 10 wt. % to 90 wt. % of composition (C1), preferably from 50 wt. % to 88 wt. % or from 70 wt. % to 85 wt. %.

The non-electroactive inorganic filler material can be uniformly dispersed in the polymeric matrix of composition (C1) to form pores having an average diameter of from 0.1 µm to 5 µm. The pore volume fraction of the composite separator obtained from the process of the invention is at least 25%, preferably at least 40%. The composite separator obtained from the process of the invention has a total thickness typically comprised between 2 µm and 100 µm, preferably between 2 µm and 40 µm.

The layer (LS) may be either a non-porous substrate layer or a porous substrate layer. Should the substrate layer be a multilayer substrate, the outer layer of said substrate may be either a non-porous substrate layer or a porous substrate layer. By the term "porous substrate layer", it is hereby intended to denote a substrate layer containing pores of finite dimensions.

The layer (LS) has typically a porosity advantageously of at least 5%, preferably of at least 10%, more preferably of at least 20% or at least 40% and advantageously of at most 90%, preferably of at most 80%.

The thickness of layer (LS) is not particularly limited and is typically from 3 to 100 micrometer, preferably form 5 and 50 micrometer.

The layer (LS) is advantageously a fabric made from one or more sets of polymer fibres.

For the purpose of the present invention, the term "fabric" is understood to mean a planar textile structure obtainable by interlacing one or more sets of polymer fibres leading to numerous pores.

The fabric may be a woven fabric made from one or more sets of polymer fibres or a non-woven fabric made from one or more sets of polymer fibres.

By "woven fabric" it is intended to denote a planar textile structure obtainable by interlacing two or more sets of polymer fibres at right angles to each other thereby providing ends which run lengthwise in the fabric and picks which run crosswise in the fabric. By "non-woven fabric" it is intended to denote a planar textile structure obtainable by randomly interlocking or bonding mechanically, thermally or chemically one or more sets of polymer fibres leading to numerous pores.

The fabric may be a uni-directional fabric wherein the majority of the polymer fibres run in one direction, or a multi-directional fabric wherein two or more sets of continuous fibres run in different directions.

The layer (LS) can be made by any porous substrate or fabric commonly used for a separator in electrochemical device, comprising at least one material selected from the group consisting of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, polyvinylidene fluoride, polyethyleneoxide, polyacrylonitrile, polyethylene and polypropylene, or their mixtures.

Preferably, layer (LS) is polyethylene or polypropylene.

The ratio between the weight of the coating and the weight of layer ($S_C$) is preferably from 3:1 to 0.5:1, more preferably 2:1, 1.5:1, 1:1 or 0.75:1.

Preferably, step (iii) is performed via a technique selected from casting, spray coating, roll coating, doctor blading, slot die coating, gravure coating, ink jet printing, spin coating and screen printing, brush, squeegee, foam applicator, curtain coating, vacuum coating, rotating disk spray coating.

Preferably, step (iv) is performed at a temperature lower than 55° C., preferably lower than 40° C., more preferably lower than 30° C.

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

Experimental Section

Materials and Methods

Solef® PVDF 75130 powder: VDF-AA and VDF-HFP-AA random copolymer containing 2.3 mol. % of HFP and 0.7 mol. % of AA, manufactured in suspension polymerization, was obtained from Solvay Specialty Polymers Italy S.p.A.

Solef® PVDF XPH 884 latex: VDF-AA and VDF-HFP-AA random copolymer containing 2.8 mol. % of HFP and 0.6 mol. % of AA, manufactured in emulsion polymerization, was obtained from Solvay Specialty Polymers Italy S.p.A.

The solvents and reactants were purchased and used as such.

Synthesis of Polymer 1 (Complying with General Structure B-A-B)

HFP final content was 2.9 mol. %.

Phase 1(A). In a 21 lt. horizontal reactor autoclave equipped with baffles and stirrer working at 50 rpm, 13.5 lt. of deionized water were introduced. Then, 6.6 g of 1,4-diiodoperfluorobutane ($C_4F_8I_2$) as chain transfer agent were added. The temperature was brought to 90° C. and a pressure of 20 Bar Ass was maintained constant throughout the whole trial by feeding VDF gaseous monomers. 15 ml of a 100 g/l aqueous solution of ammonium persulfate (APS) were added over a period of 5 minutes (200 ml/h) and at the same time 50 ml of a solution of acrylic acid (AA) (50 g/l of acrylic acid in water) were fed every 250 g of polymer synthesized.

After 30 minutes, the solution of APS was fed at a flux rate of 240 ml/h for the whole duration of the run. When 700 g of VDF gaseous monomers was fed, the flow of VDF was interrupted, the reactor was cooled to room temperature and the pressure went down to 12 Bar.

Phase 2(B). Maintaining the latex into the reactor, the feeding was change in the VDF/HFP gaseous mixture monomers to a mol. ratio of 95:5, respectively. The temperature was brought to 90° C. and the pressure of 35 Bar was maintained.

Then, 50 ml of a solution of acrylic acid (AA) (50 g/l of acrylic acid in water) were fed every 250 g of polymer synthesized and the solution of APS was fed at a flux rate of 350 ml/h for the whole duration of the run.

When 3150 g of the mixture were fed, the feeding mixture was interrupted, the reactor was cooled to room temperature, vented and the latex recovered. Final reaction time was 150 min.

The block co-polymer so obtained contained 96.5% by moles of VDF, 2.9% by moles of HFP and 0.6% by moles of acrylic acid (AA) monomer.

The aqueous latex so obtained had a solid content of 21.0% by weight.

The block co-polymer was dispersed in the aqueous latex under the form of particles having an average primary size of 230 nm, as measured according to ISO 13321, and it was found to possess a melting point of 158.5° C. and a Delta H of crystallization of 37.0 J/g (determined according to ASTM D3418).

The block-copolymer in the form of powder was recovered by freeze-thawing the latex, washing the powder in demineralized water (10 times×15 L) and eventually dried in a vent oven at 80° C. overnight.

Synthesis of Polymer 2 (Complying with General Structure A-B-A)

HFP final content was 3.4 mol. %.

Phase 1(B). In a 21 lt. horizontal reactor autoclave equipped with baffles and stirrer working at 50 rpm, 13.5 lt. of deionized water were introduced. Then, 6.6 g of 1,4-diiodoperfluorobutane ($C_4F_8I_2$) as chain transfer agent were added. The temperature was brought to 90° C. and a pressure of 35 Bar Ass was maintained constant throughout the whole trial by feeding VDF/HFP gaseous mixture monomers in a mole ratio of 95:5, respectively. 250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes, the solution of APS was fed at a flux rate of 240 ml/h for the whole duration of the run. When 3150 g of VDF/HFP gaseous mixture monomers were fed, the flow of monomer mixture was interrupted, the reactor was cooled to room temperature and vented.

Phase 2(A). Maintaining the latex into the reactor the feeding was change in the VDF gaseous monomer. The temperature was brought to 90° C. and the pressure up to 35 Bar with VDF.

50 ml of a solution of acrylic acid (AA) (50 g/l of acrylic acid in water) were fed every 250 g of polymer synthesized and the solution of APS was fed at a flux rate of 240 ml/h for the whole duration of the run.

When 900 g of the VDF monomer were fed, the feeding was interrupted, the reactor was cooled to room temperature, vented and the latex recovered. Final reaction time was 121 min.

The block co-polymer so obtained contained 96.0% by moles of VDF, 3.4% by moles of HFP and 0.6% by moles of acrylic acid (AA) monomer.

The aqueous latex so obtained had a solid content of 22% by weight.

The block co-polymer was dispersed in the aqueous latex under the form of particles having an average primary size of 310 nm, as measured according to ISO 13321, and was found to possess a melting point of 152.1° C. and a Delta H of crystallization of 35.1 J/g (determined according to ASTM D3418).

The block-copolymer in the form of powder was recovered by freeze-thawing the latex, washing the powder washed in demineralized water (10 times×15 L) and eventually dried in a vent oven at 80° C. overnight.

Synthesis of Polymer 3 (Complying with General Structure B-A-B)

HFP final content was 4.7 mol. %.

Phase 1(A). In a 21 lt. horizontal reactor autoclave equipped with baffles and stirrer working at 50 rpm, 13.5 lt. of deionized water were introduced. Then, 6.6 g of 1,4-diiodoperfluorobutane ($C_4F_8I_2$) as chain transfer agent were added. The temperature was brought to 90° C. and a pressure of 20 Bar Ass was maintained constant throughout the whole trial by feeding VDF gaseous monomers. 15 ml of a 100 g/l aqueous solution of ammonium persulfate (APS) were added over a period of 5 minutes (200 ml/h) and at the same time 50 ml of a solution of acrylic acid (AA) (50 g/l of acrylic acid in water) were fed every 250 g of polymer synthesized.

After 30 minutes, the solution of APS was fed at a flux rate of 240 ml/h for the whole duration of the run. When 700 g of VDF gaseous monomers was fed, the flow of VDF was interrupted, the reactor was cooled to room temperature and the pressure went down to 12 Bar.

Phase 2(B). Maintaining the latex into the reactor, the feeding was change in the VDF/HFP gaseous mixture monomers to a mol. ratio of 92:8, respectively. The temperature was brought to 90° C. and the pressure of 35 Bar was maintained.

Then, 50 ml of a solution of acrylic acid (AA) (50 g/l of acrylic acid in water) were fed every 250 g of polymer synthesized and the solution of APS was fed at a flux rate of 350 ml/h for the whole duration of the run.

When 3150 g of the mixture were fed, the feeding mixture was interrupted, the reactor was cooled to room temperature, vented and the latex recovered. Final reaction time was 161 min.

The block co-polymer so obtained contained 94.7% by moles of VDF, 4.7% by moles of HFP and 0.6% by moles of acrylic acid (AA) monomer.

The aqueous latex so obtained had a solid content of 21.2% by weight.

The block co-polymer was dispersed in the aqueous latex under the form of particles having an average primary size of 231 nm, as measured according to ISO 13321, and it was found to possess a melting point of 159.2° C. and a Delta H of crystallization of 29.9 J/g (determined according to ASTM D3418).

The block-copolymer in the form of powder was recovered by freeze-thawing the latex, washing the powder in demineralized water (10 times×15 L) and eventually dried in a vent oven at 80° C. overnight.

Synthesis of Polymer 4 (Complying with General Structure A-B-A)

HFP final content was 4.7 mol. %.

Phase 1(B). In a 21 lt. horizontal reactor autoclave equipped with baffles and stirrer working at 50 rpm, 13.5 lt. of deionized water were introduced. Then, 6.6 g of 1,4-diiodoperfluorobutane ($C_4F_8I_2$) as chain transfer agent were added. The temperature was brought to 90° C. and a pressure of 35 Bar Ass was maintained constant throughout the whole trial by feeding VDF/HFP gaseous mixture monomers in a mole ratio of 92:8, respectively. 250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes, the solution of APS was fed at a flux rate of 240 ml/h for the whole duration of the run. When 3150 g of VDF/HFP gaseous mixture monomers were fed, the flow of monomer mixture was interrupted, the reactor was cooled to room temperature and vented.

Phase 2(A). Maintaining the latex into the reactor the feeding was change in the VDF gaseous monomer. The temperature was brought to 90° C. and the pressure up to 35 Bar with VDF.

50 ml of a solution of acrylic acid (AA) (50 g/l of acrylic acid in water) were fed every 250 g of polymer synthesized and the solution of APS was fed at a flux rate of 240 ml/h for the whole duration of the run.

When 900 g of the VDF monomer were fed, the feeding was interrupted, the reactor was cooled to room temperature, vented and the latex recovered. Final reaction time was 112 min.

The block co-polymer so obtained contained 94.7% by moles of VDF, 4.7% by moles of HFP and 0.6% by moles of acrylic acid (AA) monomer.

The aqueous latex so obtained had a solid content of 22% by weight.

The block co-polymer was dispersed in the aqueous latex under the form of particles having an average primary size of 304 nm, as measured according to ISO 13321, and was found to possess a melting point of 150.9° C. and a Delta H of crystallization of 31.8 J/g (determined according to ASTM D3418).

The block-copolymer in the form of powder was recovered by freeze-thawing the latex, washing the powder washed in demineralized water (10 times×15 L) and eventually dried in a vent oven at 80° C. overnight The characterization of the polymers prepared as described above is reported in the following Table 1.

TABLE 1

| Polymer | HFP (amount mol. %) | MV [KPoise] (230° C.; 100 sec$^{-1}$) | η [mL/kg] | Insoluble (%) |
|---|---|---|---|---|
| Solef ® PVDF XPH 884 (*) | 3.0 | 22 | 0.12 | 30 |
| Solef ® PVDF XPH 882 (*) | 5.0 | 22 | 0.11 | 30 |
| 1 | 2.9 | 9 | 0.08 | <3 |
| 2 | 3.4 | 20 | 0.12 | <3 |
| 3 | 4.7 | 7 | 0.07 | <3 |
| 4 | 4.7 | 16 | 0.12 | <3 |

(*) comparison
MV = melt viscosity
η = intrinsic viscosity

The results provided in Table 1 showed that the co-polymers comprising alternated soft and hard blocks according to the present invention had a lower amount of insoluble compared to the random copolymers used as comparison.

As a consequence, the co-polymers according to the present invention can be advantageously used in the preparation of slurry for application in lithium batteries.

The difference in the melt viscosity (MV) value was not found to negatively affect the behaviour of the co-polymer in such application.

Example 1—Swelling in Electrolyte

The swelling behavior was evaluated by measuring the increase in weight of molded samples of Polymer 1 and Polymer 2 after immersion into a carbonate mixture.

The specimens were obtained by moulding the powders obtained from the coagulated latexes into a stainless steel frame, by means of a flat press. The stainless steel frame was designed to obtain 5 circular samples with diameter of 25 mm and thickness of 1.5 mm. The polymeric samples were obtained by melting the polymer at a temperature of 60° C. higher than the melting temperature of the polymer and then cooling at room temperature.

The circular polymeric samples (∅=25 mm; 1.5 mm thick) were dried at 55° C. overnight. Their dry weight and thickness were measured and afterwards they were immersed in EC (ethylene carbonate):DMC (dimethyl carbonate) 1:1 (wt.). The weight of the samples was periodically measured, after immersion into the swelling agent, until the plateau uptake was reached.

The plateau values of relative weight increase are summarized in the following Table 1.

Example 2—Dry Adhesion to the Cathode

Polyolefin separators were coated with a solution of DMA, TPG and PVDF (component ratio by weight: 9/9/1) by means of a doctor blade. After the coating step, the separators were dried under vacuum at 70° C.

Separators were therefore laminated, exposing the coated surface to cathode electrodes.

Cathode composition was as follows:
2 wt. % of PVDF SOLEF 5130® (polymeric binder)
3 wt. % of carbon black superC65 by IMERYS (electron conductive agent)
95 wt. % of Nickel Manganese Cobalt Oxide by L&F (cathode active material).

The porosity of cathode was 40%.

Lamination of separator onto cathode surface was performed using a hydraulic flat press at the following conditions of pressure, time and temperature: 1 MPa, 15 min and 85° C.

After lamination the adhesion strength was evaluated applying a peeling test at 180° and 300 mm/min following ASTMD903.

The results are summarized in the following Table 2.

TABLE 2

| Polymer | Weight uptake (%) | Dry lamination strength (N/m) |
|---|---|---|
| Solef ® PVDF 75130 powder(*) | 42 | 1.55 |
| Solef ® PVDF XPH 884 (*) | 35 | 1.00 |
| Polymer 1 | 36 | 1.95 |
| Polymer 2 | 40 | 3.37 |

(*) comparative

Polymer 1 and Polymer 2 showed an advantageous combination of dry lamination and swelling performance with respect to both comparative examples.
Polymer 1 and Polymer 2 provided indeed higher lamination strength than the comparative examples coupled with lower or comparable swelling values.

The invention claimed is:

1. A fluorinated block copolymer ($F_b$) comprising:
at least one first block (A) consisting of a sequence of recurring units, said sequence consisting of recurring units derived from 1,1-difluoroethylene (VDF), and optionally from at least one monomer (M) comprising at least one ethylenically unsaturated double bond and at least one functional group selected from —COOH and —OH; and
at least one second block (B) consisting of a sequence of recurring units, said sequence consisting of recurring units derived from 1,1-difluoroethylene (VDF), at least one perhalogenated monomer (PF), and optionally from at least one monomer (M) as defined above,
with the proviso that at least one of said block (A) and said block (B) comprises recurring units derived from said monomer (M);
wherein said copolymer ($F_b$) comprises:
recurring units derived from said at least one monomer (PF) in a total amount from 1.5 mol. % to less than 15 mol. % based on 100% moles of said copolymer ($F_b$); and
recurring units derived from said monomer (M) in a total amount of from 0.05 mol. % to 2 mol. % based on 100% moles of said copolymer ($F_b$),
the remaining amount up to 100% moles being from recurring units derived from VDF.

2. The copolymer ($F_b$) according to claim 1, wherein said copolymer ($F_b$) comprises recurring units derived from said monomer (M) in an amount of from 0.5 mol. % to 1.9 mol. % based on 100 moles of said copolymer ($F_b$).

3. The copolymer ($F_b$) according to claim 1, wherein said at least one monomer (PF) is selected from the group consisting of:
$C_2$-$C_8$ perfluoroolefins;
chloro- and/or bromo- and/or iodo-$C_2$-$C_6$ fluoroolefins;
—$CF_2$=$CFOX_0$ wherein $X_0$ is selected from: $C_1$-$C_{12}$ perfluoroalkyl group; $C_1$-$C_{12}$ perfluorooxyalkyl group having one or more ether groups; —$CF_2OR_{f2}$ wherein $R_{f2}$ is a $C_1$-$C_6$ perfluoroalkyl group or a $C_1$-$C_6$ (per)fluorooxyalkyl group having one or more ether groups;
perfluorodioxoles;
and/or
said at least one monomer (M) is at least one (meth)acrylic monomer (MA).

4. The copolymer ($F_b$) according to claim 1, wherein said at least one monomer (PF) is a $C_2$-$C_8$ perfluoroolefins.

5. The copolymer ($F_b$) according to claim 4, wherein said copolymer ($F_b$) comprises recurring units derived from HFP in an amount from 2 mol. % to less than 12 mol. % based on 100 moles of said copolymer ($F_b$).

6. The copolymer ($F_b$) according to claim 1, wherein said monomer (M) is selected from the group consisting of: acrylic acid (AA), methacrylic acid, hydroxyethylmethacrylate, hydroxyethylacrylate (HEA), hydroxypropylmethacrylate, hydroxypropylacrylate (HPA), hydroxyethylhexylmethacrylatem hydroxyethylhexylacrylate, and mixtures thereof.

7. The copolymer ($F_b$) according to claim 6, wherein said at least one monomer (M) is selected from:
hydroxyethyl acrylate (HEA) of formula:

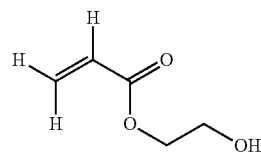

2-hydroxypropyl acrylate (HPA) of either of formulae:

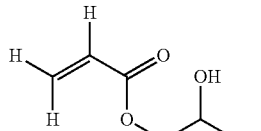

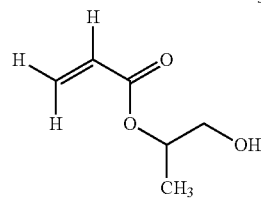

acrylic acid (AA) of formula:

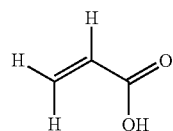

or mixtures thereof.

8. The copolymer (F$_b$) according to claim 1, wherein said copolymer (F$_b$) comprises alternately arranged block(s) (A) and block(s) (B).

9. The copolymer (F$_b$) according to claim 1, wherein:
one block (A) is interposed between two blocks (B) and said copolymer (F$_b$) complies with the following formula: B-A-B; or
one block (B) is interposed between two blocks (A) and said copolymer (F$_b$) complies with the following formula: A-B-A.

10. The copolymer (F$_b$) according to claim 1, wherein
said block (A) consists of a sequence of recurring units derived from 1,1-difluoroethylene (VDF) and from monomer (M); and/or
said block (B) consists of a sequence of recurring units derived from 1,1-difluoroethylene (VDF), hexafluoropropene (HFP) and monomer (M);
wherein monomer (MA) (M) is selected from the group consisting of: acrylic acid (AA), methacrylic acid, hydroxyethylmethacrylate, hydroxyethylacrylate (HEA), hydroxypropylmethacrylate, hydroxypropylacrylate (HPA), hydroxyethylhexylmethacrylatem hydroxyethylhexylacrylate, and mixtures thereof.

11. A composition (C1) in the form of an aqueous dispersion comprising primary particles of at least copolymer (F$_b$), said copolymer (F$_b$) being as defined in claim 1.

12. The composition according to claim 11, wherein the particles of said copolymer (Fb) have an average primary size of less than 1 micrometer, as measured according to ISO 13321.

13. A separator for an electrochemical cell comprising a substrate layer (S$_C$) at least partially coated with composition (C1) as defined in claim 11.

14. A process for the manufacture of a separator for an electrochemical cell as defined in claim 13, said process comprising:
applying said composition (C1) at least partially onto at least one portion of a noncoated substrate layer (LS), thus providing an at least partially coated substrate layer (S$_C$); and drying said layer (S$_C$).

15. An electrochemical cell comprising the at least partially coated separator as defined in claim 13.

16. The electrochemical cell of claim 15, which is a secondary battery or a capacitor.

17. The copolymer (Fb) according to claim 3, wherein said at least one monomer (PF) is selected from the group consisting of:
tetrafluoroethylene (TFE) and hexafluoropropylene (HFP);
chlorotrifluoroethylene (CTFE);
CF$_2$=CFOX$_0$ wherein X$_0$ perfluoro-2-propoxy-propyl; and
—CF$_2$OR$_{f2}$ wherein R$_{f2}$ is CF$_3$, C$_2$F$_5$, C$_3$F$_7$ or —C$_2$F$_5$—O—CF$_3$.

18. The copolymer (F$_b$) according to claim 3, wherein said at least one at least one (meth)acrylic monomer (MA) complies with formula (I):

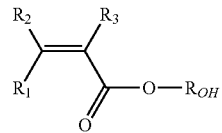

wherein:
R$_1$, R$_2$ and R$_3$, equal to or different from each other, are independently selected from a hydrogen atom and a C$_1$-C$_3$ hydrocarbon group, and
R$_{OH}$ is a hydrogen atom or a C$_1$-C$_5$ hydrocarbon moiety comprising at least one hydroxyl group.

19. The copolymer (F$_b$) according to claim 4, wherein said at least one monomer (PF) is hexafluoropropylene.

20. The copolymer (F$_b$) according to claim 10, wherein monomer (M) is selected from:
hydroxyethyl acrylate (HEA) of formula:

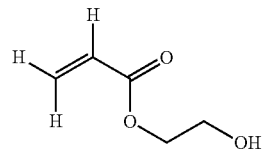

2-hydroxypropyl acrylate (HPA) of either of formulae:

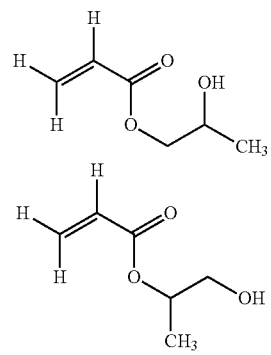

acrylic acid (AA) of formula:

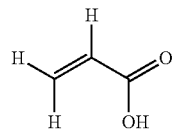

or mixtures thereof.

* * * * *